United States Patent
Saiki et al.

(10) Patent No.: US 9,858,954 B1
(45) Date of Patent: Jan. 2, 2018

(54) MAGNETIC RECORDING HEAD TEST FIXTURE FOR HEAT ASSISTED MAGNETIC RECORDING HEAD

(71) Applicant: Western Digital Technologies, Inc., Irvine, CA (US)

(72) Inventors: Noriyuki Saiki, Odawara (JP); Kazue Kudo, Odawara (JP); Takaharu Niimi, Minamiashigara (JP); Yasunobu Yanagisawa, Yokkaichi (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/334,197

(22) Filed: Oct. 25, 2016

(51) Int. Cl.
G11B 5/48 (2006.01)
G11B 5/455 (2006.01)
G11B 5/00 (2006.01)

(52) U.S. Cl.
CPC ............ *G11B 5/455* (2013.01); *G11B 5/4853* (2013.01); *G11B 2005/0021* (2013.01)

(58) Field of Classification Search
CPC ...... G11B 5/45; G11B 5/4853; G11B 5/48535
USPC ....................................... 360/234.5
See application file for complete search history.

(56) References Cited

U.S. PATENT DOCUMENTS

| | | | | |
|---|---|---|---|---|
| 5,786,962 A * | 7/1998 | Kawazoe | ............ | G11B 5/4833 360/234.5 |
| 6,459,260 B1 * | 10/2002 | Bonin | .................. | G11B 5/4853 29/603.03 |
| 6,486,660 B1 * | 11/2002 | Luse | ...................... | G11B 5/455 324/210 |
| 6,943,971 B2 * | 9/2005 | Kainuma | ............... | G11B 5/455 360/31 |
| 7,355,393 B2 * | 4/2008 | Tokutomi | ................. | G11B 5/10 324/210 |
| 7,719,796 B2 * | 5/2010 | Takahashi | ............ | G11B 5/4826 360/244.8 |
| 7,969,826 B2 | 6/2011 | Naniwa et al. | | |
| 8,089,730 B1 * | 1/2012 | Pan | ...................... | G11B 5/4826 360/244.8 |
| 8,134,804 B2 | 3/2012 | Honzawa et al. | | |
| 8,384,405 B2 * | 2/2013 | Shimazawa | ........... | H01S 5/0042 324/750.05 |
| 8,395,864 B2 * | 3/2013 | Boutaghou | ............ | G11B 5/455 360/240 |
| 8,427,783 B2 | 4/2013 | Tsuchiya et al. | | |

(Continued)

FOREIGN PATENT DOCUMENTS

CN   204022464 U   12/2014
JP   2011108301 A   6/2011

OTHER PUBLICATIONS

Jianqiang et al., "Single Crystal Silicon MEMS Microactuator for High Density Hard Disk Drive," Device and Process Technologies for MEMS and Microelectronics II, 2001, pp. 1-7.

*Primary Examiner* — Jefferson Evans
(74) *Attorney, Agent, or Firm* — Foley & Lardner LLP

(57) ABSTRACT

A test fixture for testing a slider configured for heat assisted magnetic recording. The test fixture has a three dimensional structure with contact pads configured to make contact with electrically conductive contact pads at the trailing edge of the slider. The test fixture also has a structure with a contact pad configured to make electrical contact with a contact pad formed at a backside surface of the slider.

18 Claims, 30 Drawing Sheets

(56) References Cited

U.S. PATENT DOCUMENTS

| | | | |
|---|---|---|---|
| 8,514,522 B1* | 8/2013 | Pan | G11B 5/4826 |
| | | | 324/755.01 |
| 8,618,828 B2* | 12/2013 | Ohsawa | G11B 5/486 |
| | | | 324/755.01 |
| 9,013,963 B2* | 4/2015 | Ver Meer | G11B 13/04 |
| | | | 369/13.02 |
| 9,231,328 B2* | 1/2016 | Rathburn | H01R 13/2414 |
| 2009/0086374 A1* | 4/2009 | Smith | G11B 5/4853 |
| | | | 360/234.5 |
| 2012/0033318 A1* | 2/2012 | Boutaghou | G11B 5/455 |
| | | | 360/31 |
| 2012/0049877 A1* | 3/2012 | Rathburn | G01R 1/0483 |
| | | | 324/756.02 |
| 2012/0147717 A1* | 6/2012 | Shimazawa | G11B 5/314 |
| | | | 369/13.33 |
| 2013/0087455 A1* | 4/2013 | Lee | G01N 27/3272 |
| | | | 204/403.03 |

* cited by examiner

MAGNETIC RECORDING HEAD TEST FIXTURE FOR HEAT ASSISTED MAGNETIC RECORDING HEAD

FIELD OF THE INVENTION

The present invention relates to magnetic data recording, and more particularly to a device for holding a slider during testing of magnetic recording elements, wherein the slider is configured for heat assisted magnetic recording.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor, a Tunnel Junction Magnetoresistive (TMR) sensor or a scissor type magnetoresistive sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

Prior to assembly into the data recording system, the magnetic read sensor and magnetic write head formed on the slider can be tested to ensure that the their performance is within acceptable standards. Once their performance has been found to be within desired tolerance ranges, the slider and associated read and write heads can be permanently installed into the data recording system by mounting the slider onto the suspension.

SUMMARY

The present invention provides a test fixture for testing a slider assembly, the slider assembly having a trailing edge surface with an electrically conductive contact pad formed thereon and having a backside surface configured with a contact pad formed thereon. The test fixture includes a first portion having a contact pad that is configured to make contact with the contact pad formed on the trailing edge portion of the slider. The test fixture also includes a second portion that is bonded to the first portion and that has an electrically conductive contact pad that is configured to make electrical contact with the electrically conductive contact pad formed on the back side surface of the slider.

The test fixture has a three dimensional configuration that advantageously facilitates testing of a slider that is configured for heat assisted magnetic recording. The test fixture allows the performance of a laser diode formed on the backside surface of the slider to be tested while also testing performance of read and write heads also formed on the trailing edge of the slider.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
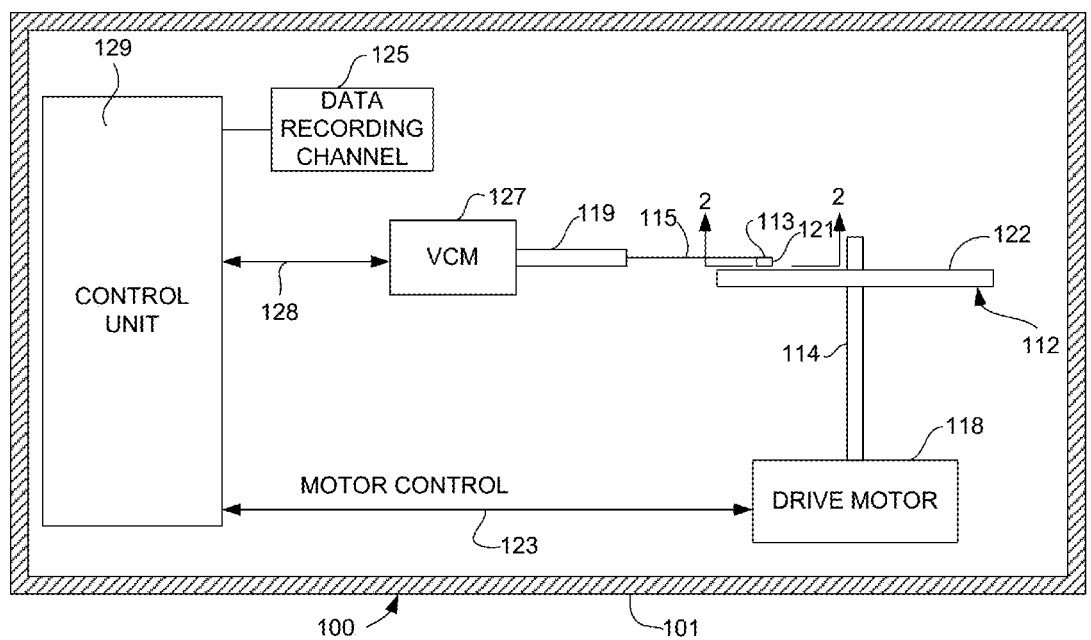
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
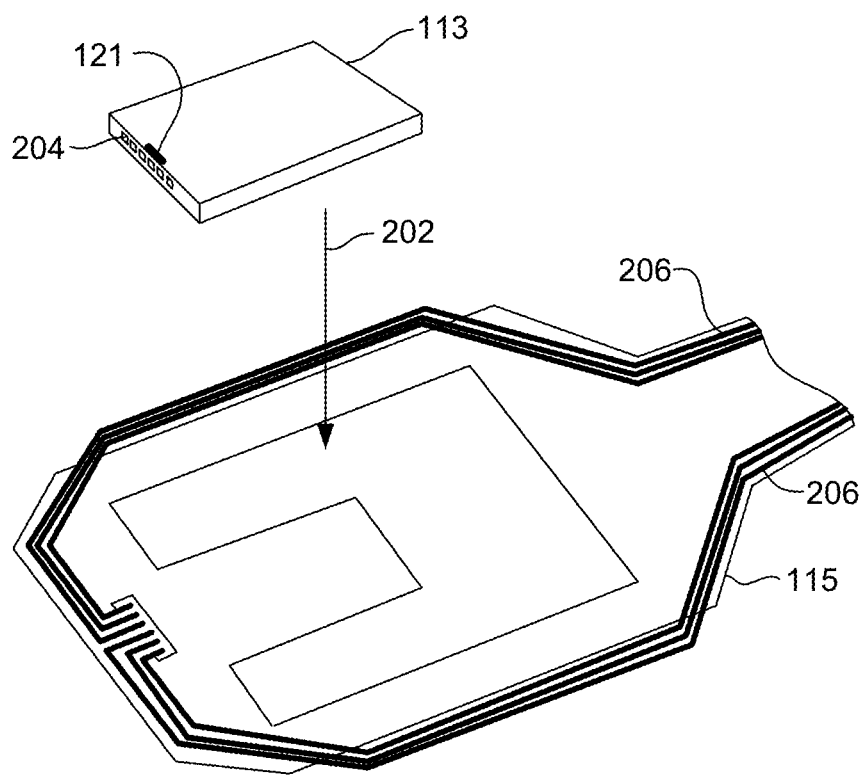
FIG. 2 is an exploded view of a slider and suspension assembly for use in a magnetic data recording system.

FIG. 2 shows an exploded view of a slider assembly 113 and a portion of a suspension assembly 115. During manufacture, the slider assembly 113 is mounted to the suspension assembly as indicated by arrow 202. The slider 113 has a magnetic read/write head 121 formed at a trailing edge of the slider 113, and the read/write head 121 is electrically connected with contact pads 204 by electrically conductive lead lines that are not shown in FIG. 2.

Once the slider 113 is permanently mounted to the suspension assembly 115, the contact pads 204 electrically connect with lead lines 206 formed on the suspension assembly 115, whereby the read/write head 121 can electrically communicate with processing circuitry 129, 125 (FIG. 1). Once the slider 113 has been permanently mounted onto the suspension 115, it cannot be easily removed. Therefore, it is desirable to test the performance of the read/write head 121 prior to permanently mounting the slider 113 to the suspension assembly 115. Should the read/write head 121 not fall within desired performance parameters, then the slider 113 can be scrapped and replaced with another slider 113 and read/write head 121.

Figure 3:
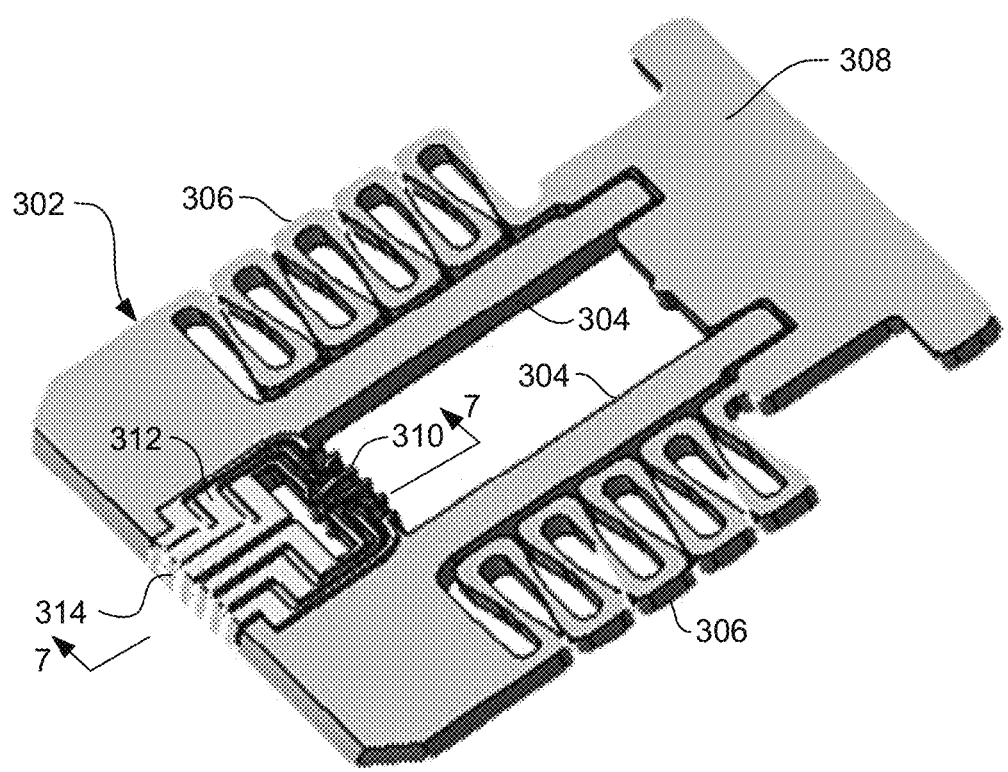
FIG. 3 is a perspective view of a test fixture for holding a slider during testing of a magnetic read/write head formed thereon.
Figure 4:
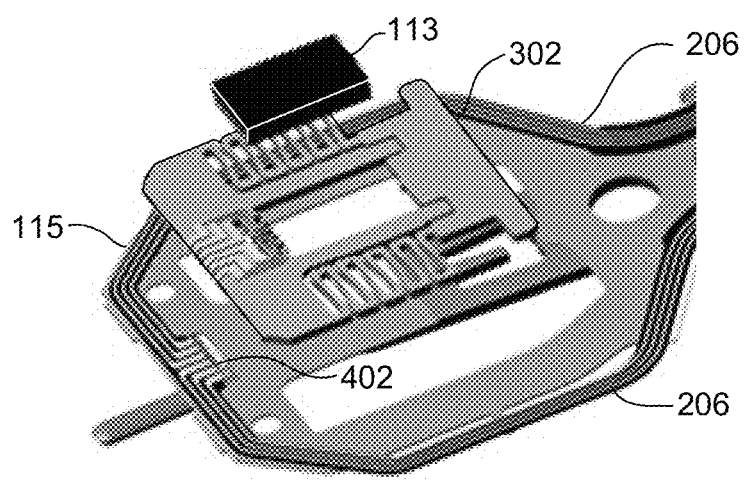
FIG. 4 is an exploded view of a slider, test fixture and suspension assembly.

FIG. 3 shows a perspective view of test fixture 302 as seen from a first side, and FIG. 4 is an exploded view of the test fixture 302 suspension 115, and slider 113. As seen in FIG. 4, the test fixture 302 is configured to receive the slider 113 and to temporarily mount within the suspension assembly 115. As seen more clearly in FIG. 3, the test fixture 302 has a guide channel 304 for receiving the slider 113. The test fixture 302 also has springs 306 and an engagement tab 308. To load a slider 113 into the test fixture 302, the engagement tab 308 can be pulled outward and the slider 113 inserted into the guide channel 304. When the engagement tab 308 is released, the springs 306 will bias the engagement tab 308 toward the slider, securely holding the slider 113 in place.

The test fixture 302 also has slider side electrically conductive contact pads 310 that are electrically connected with suspension side electrically conductive contact pads 314 by electrically conductive lead lines 312. When the slider 113 is held within the test fixture 302, the contact pads 204 of the slider 113 (FIG. 2) will engage the contact pads 310 of the test fixture 302. Similarly, when the test fixture 302 is temporarily mounted on the suspension assembly 115 as shown in FIG. 4, the suspension side contact pads 314 will engage contact pads 402 of the suspension assembly 115. This, therefore, allows the contact pads 204 of the slider 113 to be temporarily electrically connected with the lead lines 206, thereby allowing the performance of the magnetic read/write heads 121 to be tested prior to final, permanent mounting of the slider 113 to the suspension assembly 115.

Figure 5:
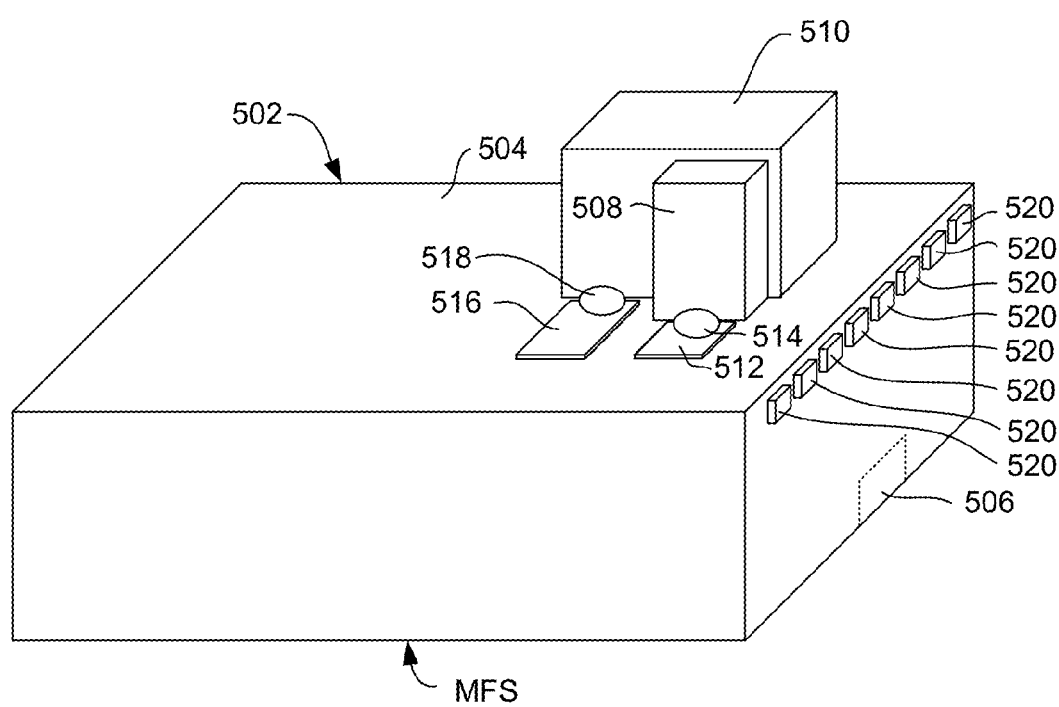
FIG. 5 is a perspective view of a slider configured for heat assisted magnetic recording, having a laser diode connected with a back side of the slider.

FIG. 5 shows a perspective view of a slider 502 that is configured for use in a Heat Assisted Magnetic Recording (HAMR) system. The slider 502 includes a slider body 504. In FIG. 5, the bottom of the slider body 504 is a media facing surface MFS. A magnetic recording head 506 is formed at a trailing edge of the slider body 504 at the Media Facing Surface MFS. In order to implement the Heat Assisted Magnetic Recording, a laser diode 508 is mounted to a backside of the slider body 504 at a side opposite the media facing surface MFS. The laser diode 508 can be mounted to a sub-mount 510 that can be constructed of a material such as Si.

The laser diode 508 can be electrically connected with an electrically conductive lead pad 512. Connection between the laser diode 508 and the electrically conductive lead pad 512 can be made by an electrically conductive solder ball 514. Similarly, the sub-mount 510 can be electrically connected with a lead pad 516, and the electrical connection between the sub-mount 510 and the lead pad 516 can be made by a solder ball 518.

As can be seen in FIG. 5, several lead pads 520 are formed on the trailing edge of the slider body 504. These lead pads 520 can be electrically connected with the read/write head 506 by electrically conductive lead lines and vias which are not shown in FIG. 5, but which would be buried in the head structure within the trailing surface of the slider body 504. These electrically conductive lead pads 520 allow for electrical connection between the read/write head 506 and suspension circuitry 208 (shown in FIG. 4).

When the laser diode 508 is activated, light from the laser diode 508 is delivered to a thermal transducer (not shown) located within the magnetic head 506. The light is delivered via a waveguide (also not shown), which can be buried within the slider body 504 within the head build.

The presence of the laser diode 508 and sub-mount 510 present a challenge with regard to testing. In order to test the performance of the laser diode 508, it is desirable to make a temporary electrical connection with the lead pads 512, 516. Whereas other electrical connections used to test the head 506 are located at the trailing edge of the slider body 504 at pads 520, contact with the lead pads 512 516 has to be made at the backside surface in a completely different orientation than the lead pads 520. Also, this temporary electrical connection with the lead pads 512, 516 must also accommodate the large structures 508, 510.

Figure 6:
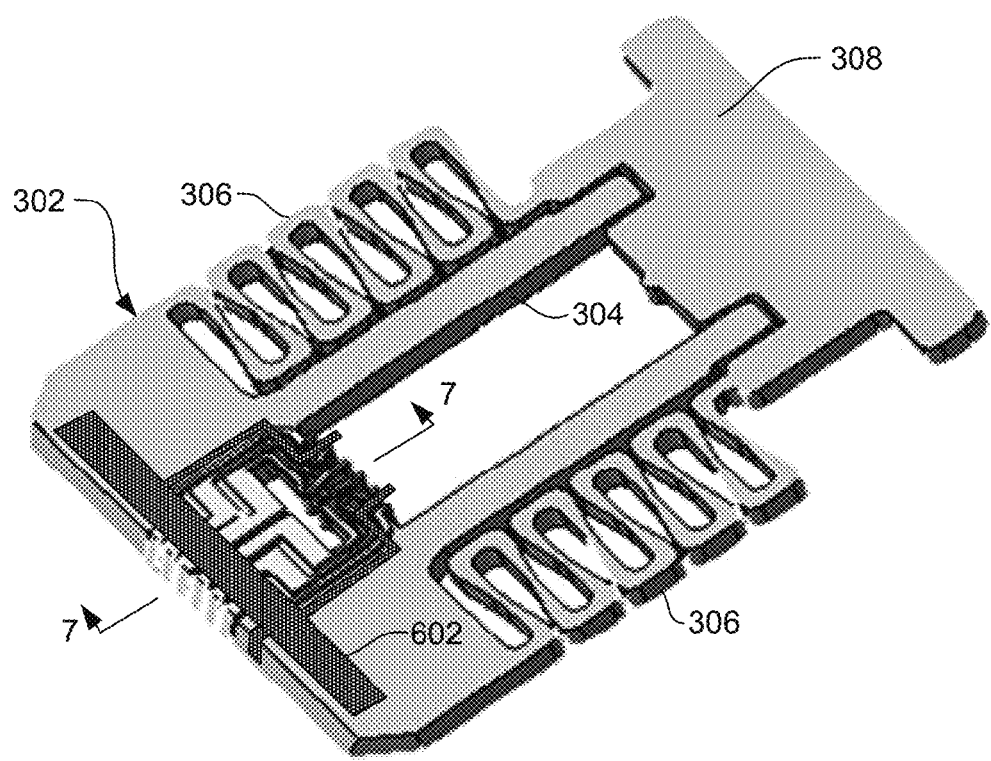
FIG. 6 is a view showing an opposite side of the test fixture of FIG. 3.
Figure 7:
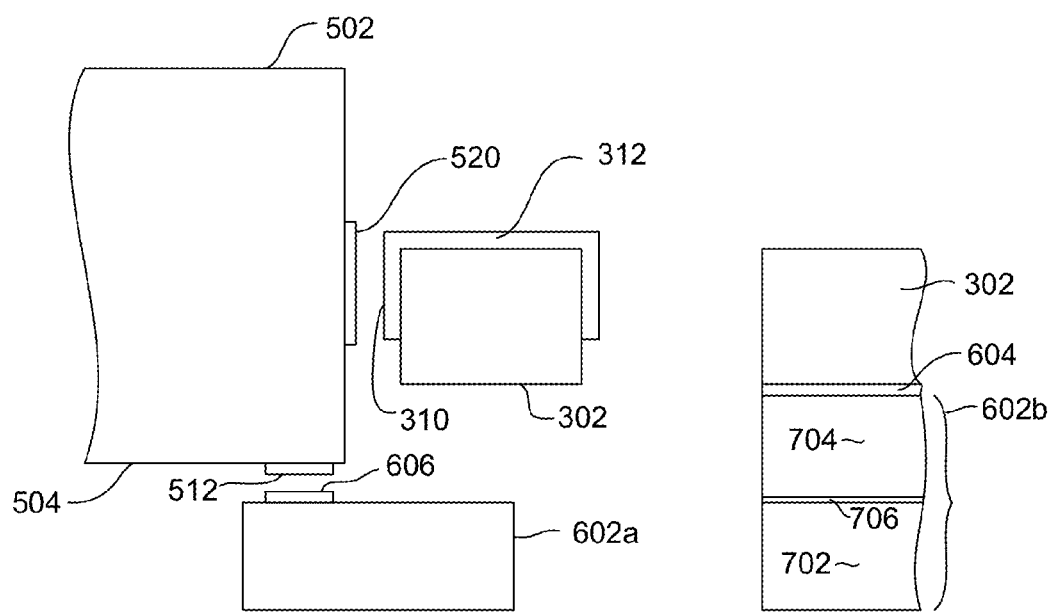
FIG. 7 is a cross sectional view of a portion of the test fixture of FIGS. 3 and 6 as seen from line 7-7 of FIG. 3.

FIGS. 6 and 7 illustrate how the test fixture 302 is configured to allow the performance of the laser diode 508 to be tested via contact with the contact pads 512, 516 (FIG. 5) simultaneously with the testing of the read/write head 506 via contact with pads 520. FIG. 6 shows a view of a side of the test fixture 302 that is opposite to that shown in FIG. 3. In other words, the test fixture 302 of FIG. 3 is flipped over in FIG. 6. Whereas FIG. 3 shows lead lines 312 for connecting with the lead pads 520 (FIG. 5) of the slider 502, the opposite side shown in FIG. 6 shows a structure 602 that can be used to make electrical connection with the lead pads 512, 516 (FIG. 5). FIG. 7 shows a side, cross-sectional view as seen from line 7-7 of FIG. 3. The view of FIG. 7 is, therefore, upside down relative to the view of FIG. 6.

The structure 602 includes a portion 602a that is configured to make contact with the lead pad 512 formed on the back side surface 504 of the slider 502, and also includes a main body portion 602b that connects with the main body of the test fixture 302. The portion 602b can include first and second semiconductor layers such as silicon (Si) 702, 704 that can be separated from one another by an electrically insulating layer 706. This structure can be referred to as a silicon on insulator structure. The portion 704 can be connected with the portion 302 by an adhesion layer 604.

The second layer 704 provides a spacer that allows the portion 602a to contact that backside 504 of the slider 502 as desired. As can be seen, the structure 302 has an electrically conductive lead layer 312 that provides an electrically conductive contact point 310 that can engage and electrically connect with the contact pad 520 formed at the trailing edge of the slider 502. The portion 602a has an electrically conductive lead pad 606 that can engage with and make electrical connection with the lead pad 512 formed on the back side surface 504 of the slider 502. A similar structure (not shown) could be used to make contact with the lead pad 516 (FIG. 5).

The structure of the test fixture 302 will be better understood with reference to FIGS. 8-30 which show the test fixture 302 in various intermediate stages of manufacture in order to illustrate a method for manufacturing a text fixture such as the test fixture 302 described above.

Figure 8:
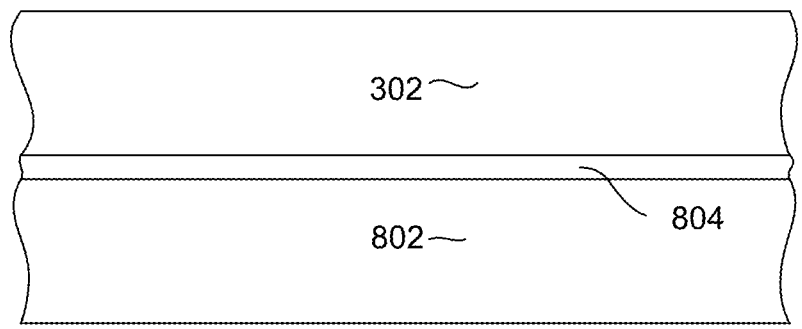
FIGS. 8-30 are views of a test fixture in various intermediate stages of manufacture, illustrating a method for manufacturing a test fixture for use with a heat assisted magnetic recording head.

Test Fixture First Layer Construction:

With reference now to FIG. 8 a first layer of semiconductor such as Si 802 is deposited. An electrically insulating layer such as alumina (Al$_2$O$_3$) 804 is deposited over the first semiconductor layer 802, and a second semiconductor layer 302 is deposited over the electrically insulating layer 804.

Figure 9:
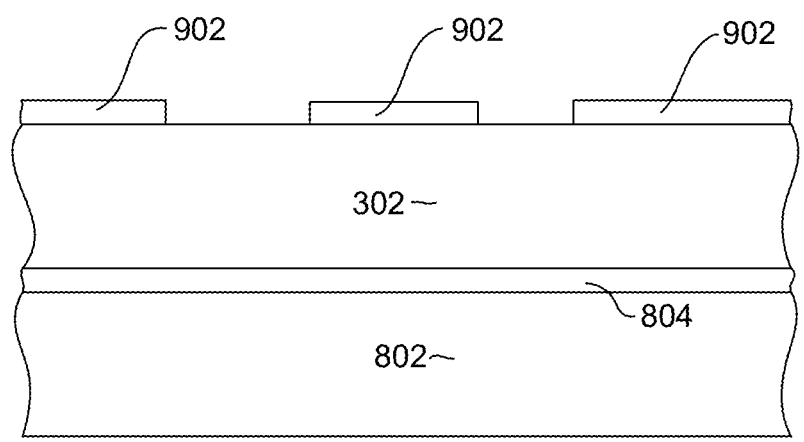
Figure 10:
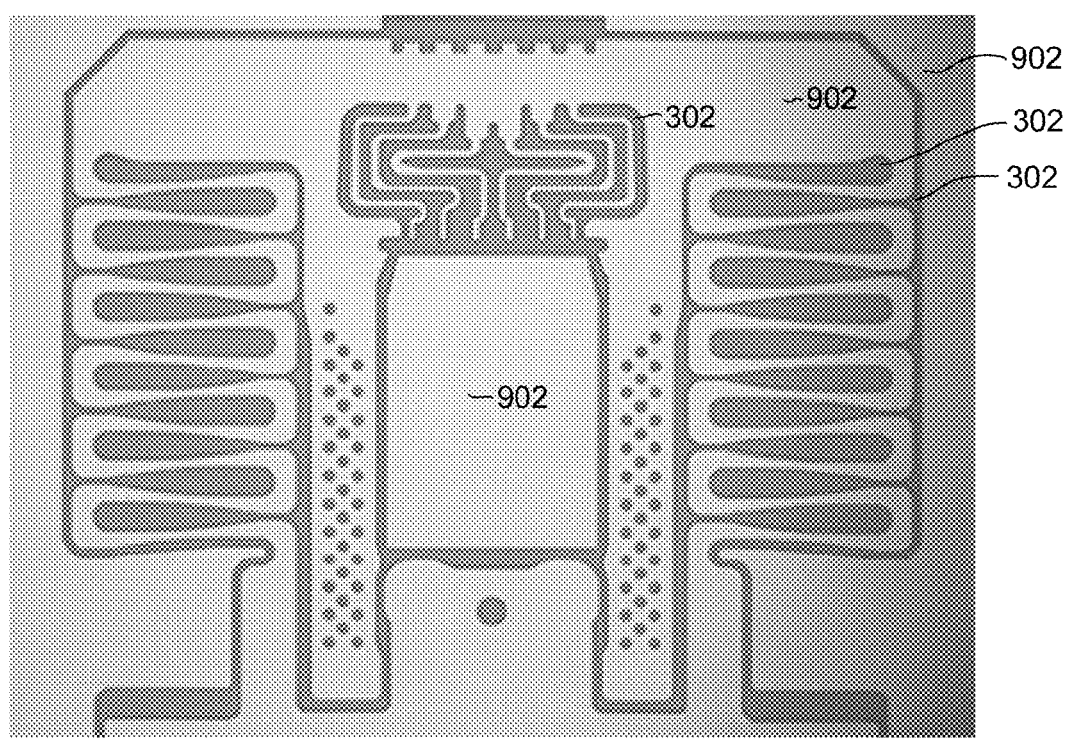

With reference now to FIG. 9 a photoresist mask 902 is formed over the layers 802, 804, 302. The photoresist mask is formed by depositing a photoresist material and then photolithographically patterning the photoresist material to form a pattern that defines a test fixture blank, with openings in the mask 902 that define the location where material will be removed. An example of a pattern that can be defined by the photoresist is shown in FIG. 10 where the lighter portions show the locations of the mask 902 and the darker portions show the locations of the under-lying layer 302 exposed through the openings in the mask 902.

Figure 11:
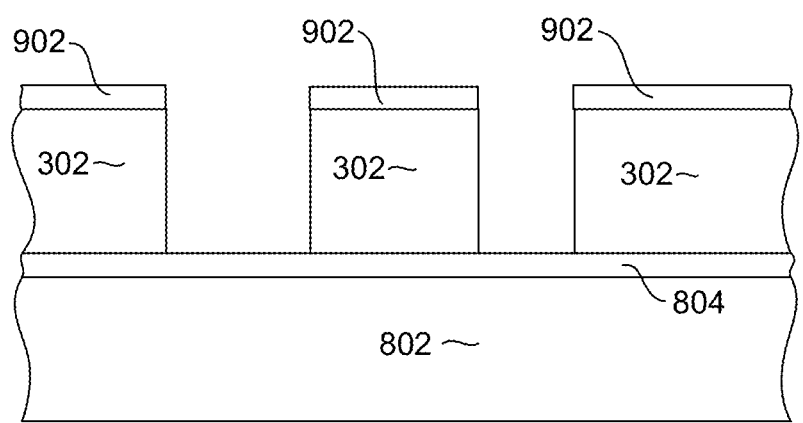

With reference now of FIG. 11 a reactive ion etching is performed to remove portions of the layer 302 that are exposed through the openings in the mask 902. The reactive ion etching can be terminated when the insulating layer 804 is reached. After the etching has been terminated, the mask 902 can be removed.

Figure 12:
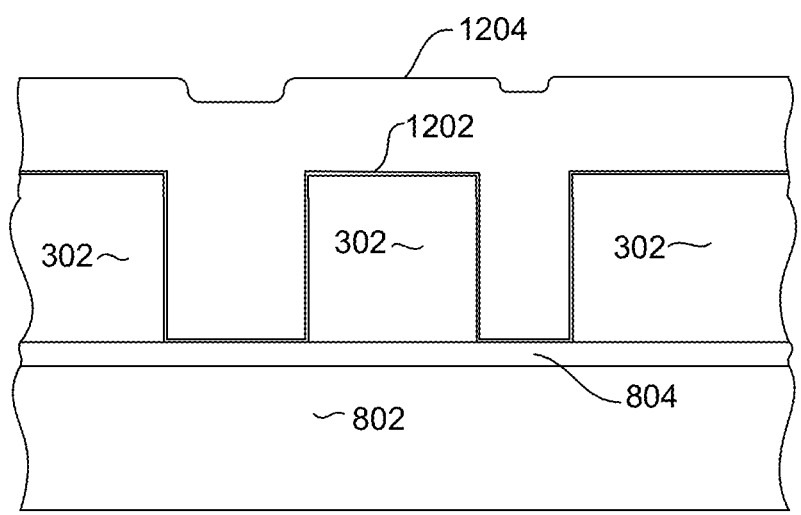
Figure 13:
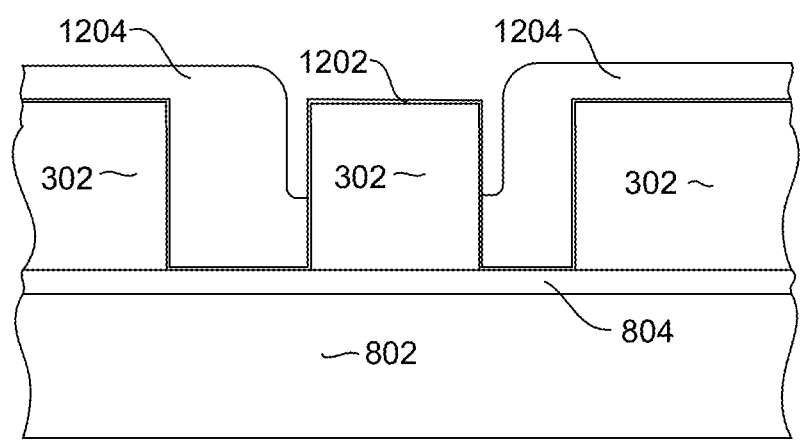

Then, with reference to FIG. 12, an electrically conductive seed layer 1202 is deposited followed by a relatively thick layer of photoresist 1204. Then, with reference to FIG. 13, the photoresist 1204 is photolithographically patterned to reduce the thickness of the photoresist 1204 only in a location where an electrically conductive lead will be formed as shown in FIG. 13.

Figure 14:
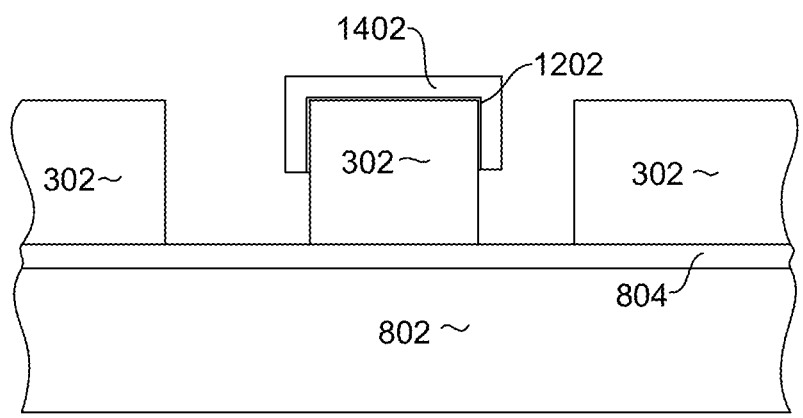
Figure 15:
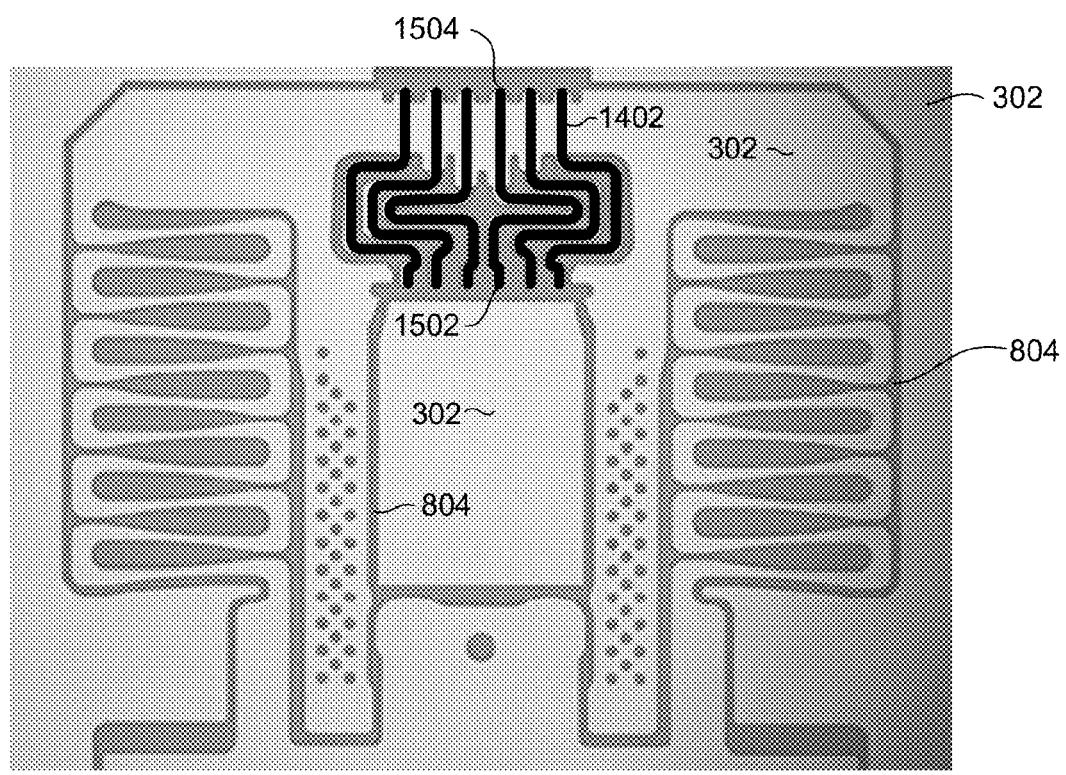

Then, an electrically conductive material such as Au or Cu 1402 is electroplated onto the exposed seed layer 1202 and the photoresist 1204 can be removed leaving a structure as shown in FIG. 14. A quick ion milling can be performed to remove unneeded portions of the seed layer 1202 in areas not protected by the electroplated material 1402. FIG. 15 shows a top down view of the structure formed thus far as seen from line 15-15 of FIG. 14. FIG. 15 shows how the lead lines 1402 extend from a slider contact end 1502 to a suspension contact end 1504.

Figure 16:
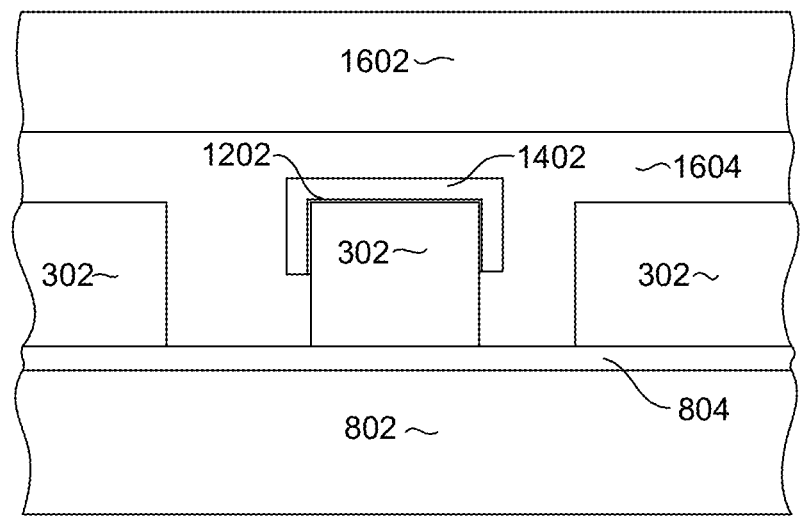
Figure 17:
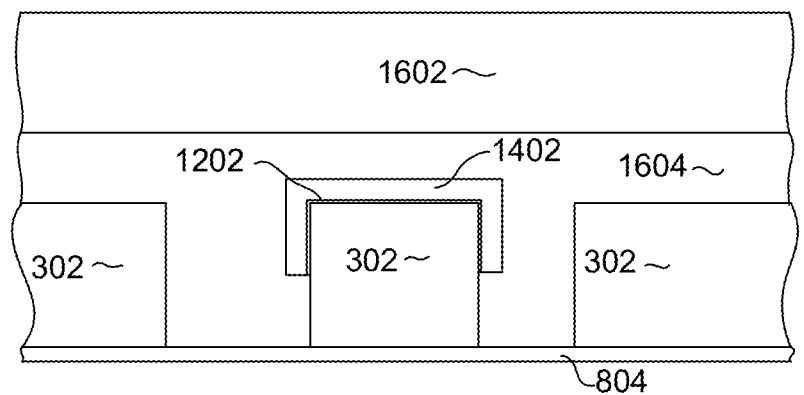
Figure 18:
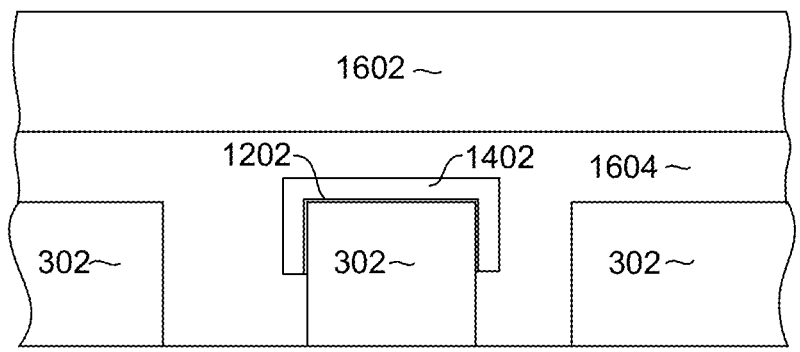

With reference now to FIG. 16, a wafer support structure 1602 is bonded to the top of the previously formed structure by a bonding layer 1604. The wafer support structure 1602 can be a Si wafer. Then, with support structure 1602 in place, a back grinding can be performed to remove the bottom semiconductor layer 802, leaving a structure as shown in FIG. 17. The wafer support structure 1602 provides support for the underlying layers during this back grinding. A dry etching process can be performed to remove the remaining insulation layer 804, leaving a structure as shown in FIG. 18.

Figure 19:
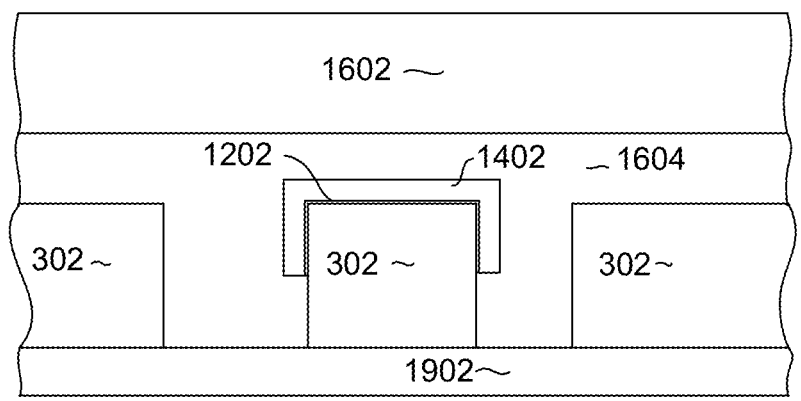
Figure 20:
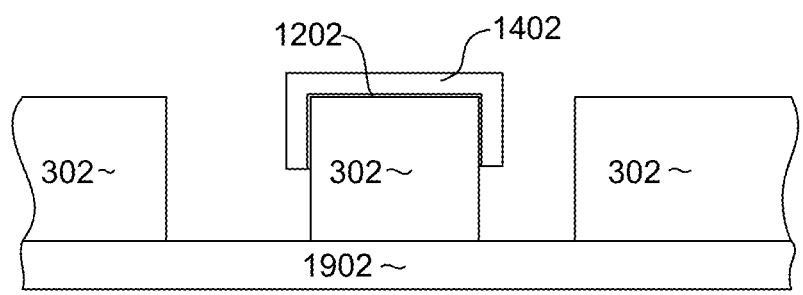

Then, with the layers 802, 804 removed, an adhesion material 1902 is applied to the bottom of the structure as shown in FIG. 19. The adhesion material 1902 is preferably an adhesion tape. This adhesion tape 1902 will later be used to connect a structure for providing electrical contact with the backside surface of a slider. A material removal process can then be used to remove the bonding material 1604 and wafer support 1602, leaving a structure as shown in FIG. 20.

Figure 21:
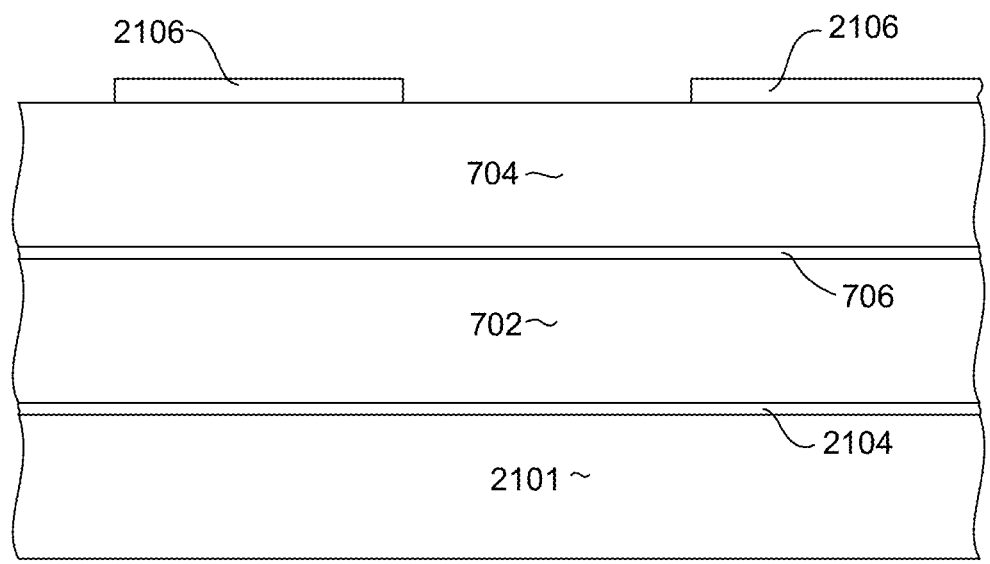

Test Fixture Second Layer Construction:

The previously described process provides a method for manufacturing a main body portion of a test fixture having leads for connecting with trailing edge pads of a slider. FIGS. 21-27 describe a process for forming a test fixture portion configured for making contact with a backside lead contact of the slider. With reference now to FIG. 21, a double silicon on insulator structure is formed. This includes first second and third layers of semiconductor (preferably Si) 2102, 702, 704. The first and second layers 2102, 702 are separated from one another by a first layer of electrically insulating material such as alumina 2104 and the second and third semiconductor layers 702, 704 are separated from one another by a second semiconductor layer 706.

Figure 22:
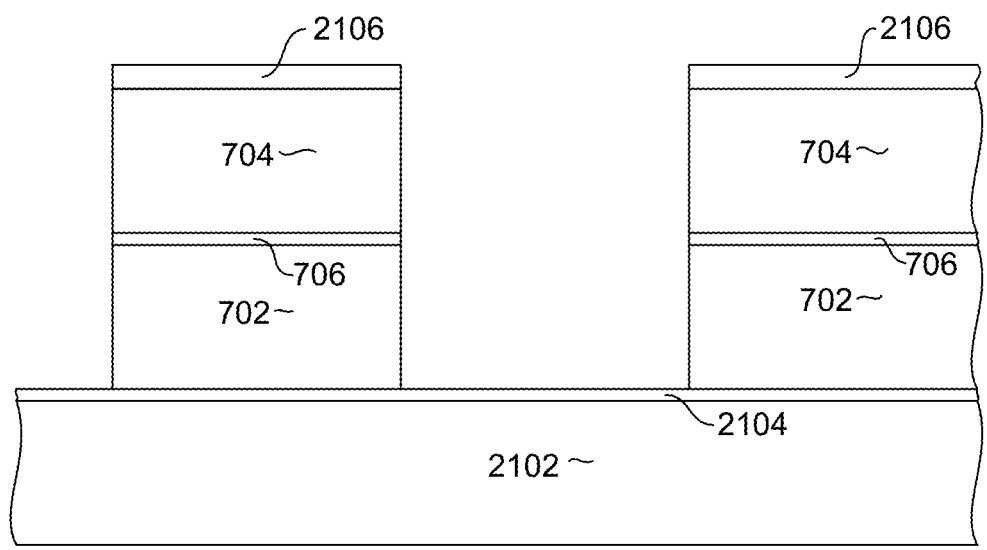

A mask 2106 is formed over the layers 2102, 2104, 702, 706, 704. The mask 2106 can be constructed of a photolithographically patterned photoresist and is configured to define the shape of a second test fixture layer that is configured to make contact with an electrical contact pad located on a backside surface of a slider. A reactive ion etching process can be performed to remove portion of layers 702, 706, 704 that are not protected by the mask 2106, leaving a structure as shown in FIG. 22.

Figure 23:
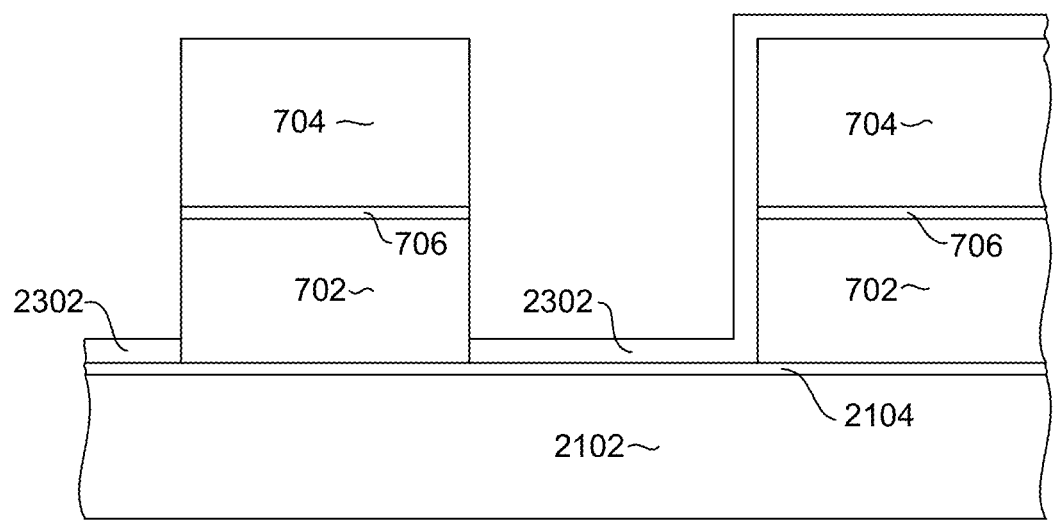
Figure 24:
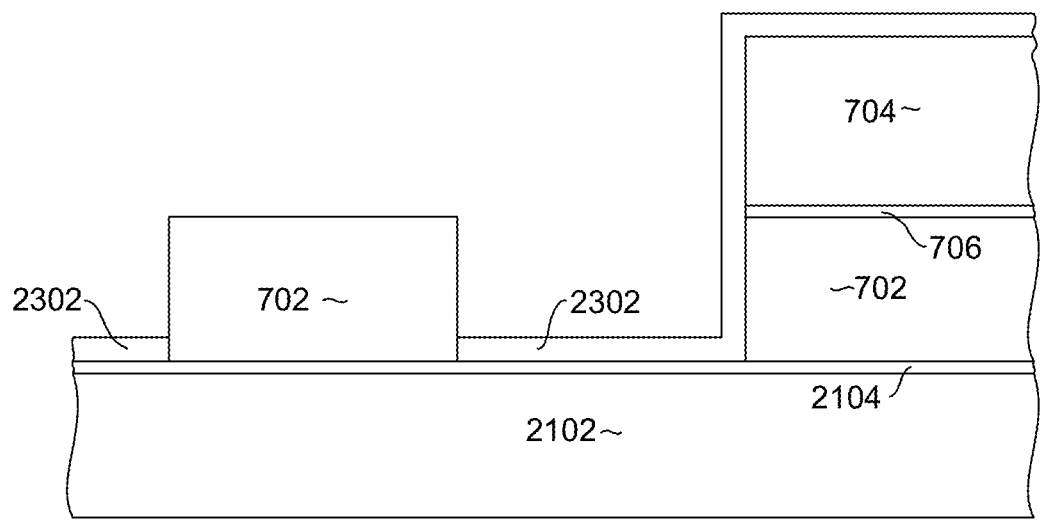

With reference now to FIG. 23, the previously formed mask 2106 is removed and a second photoresist mask 2302 is formed. The mask 2302 can be formed by depositing a layer of photoresist and photolithographically patterning the photoresist so as to leave a portion of the underlying structure uncovered. The mask 2302 is constructed so as to expose a portion of the underlying structure that will be used to make contact with an electrical contact pad on the backside surface of the slider, as will be seen. After the mask 2302 has been formed, a reactive ion etching can be performed to remove the portion of the layer 704 that is not protected by the mask 2302. This reactive ion etching can be terminated when the layer 702 has been reached, leaving a structure as shown in FIG. 24. After the reactive ion etching has been performed, the mask 2302 can be removed.

Figure 25:
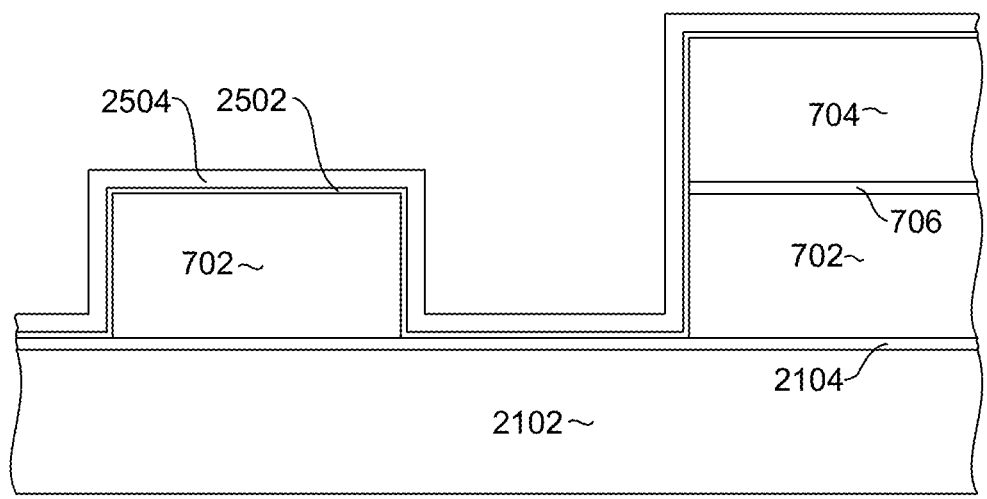

With reference to FIG. 25, an electrically conductive seed layer 2502 is deposited. The electrically conductive seed layer 2502 can be a material such as Cu or Au and can be deposited by sputter deposition. Then, a layer of electrically conductive lead material 2504 is electroplated over the seed layer 2502.

Figure 26:
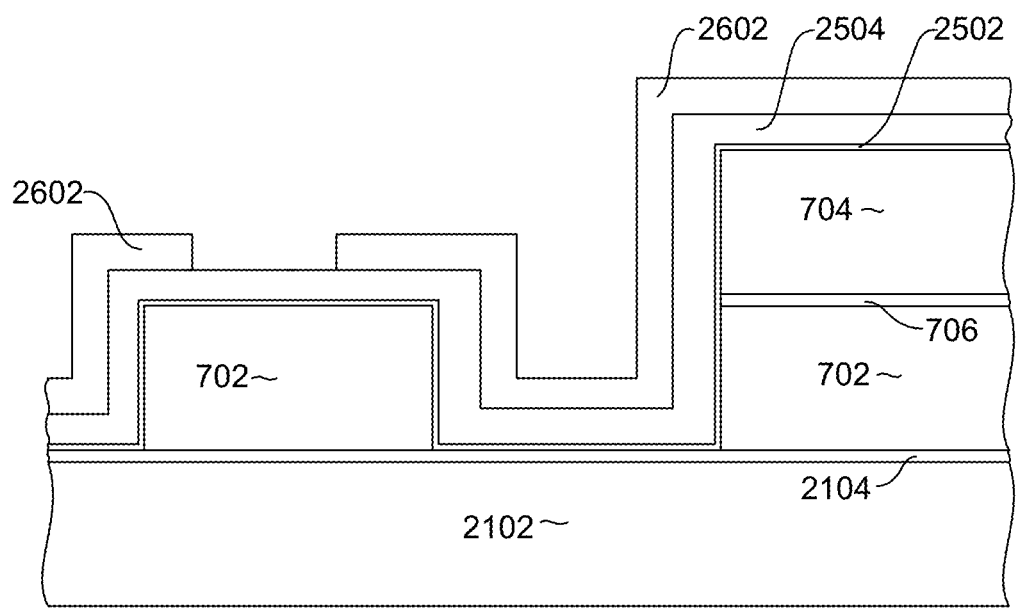
Figure 27:
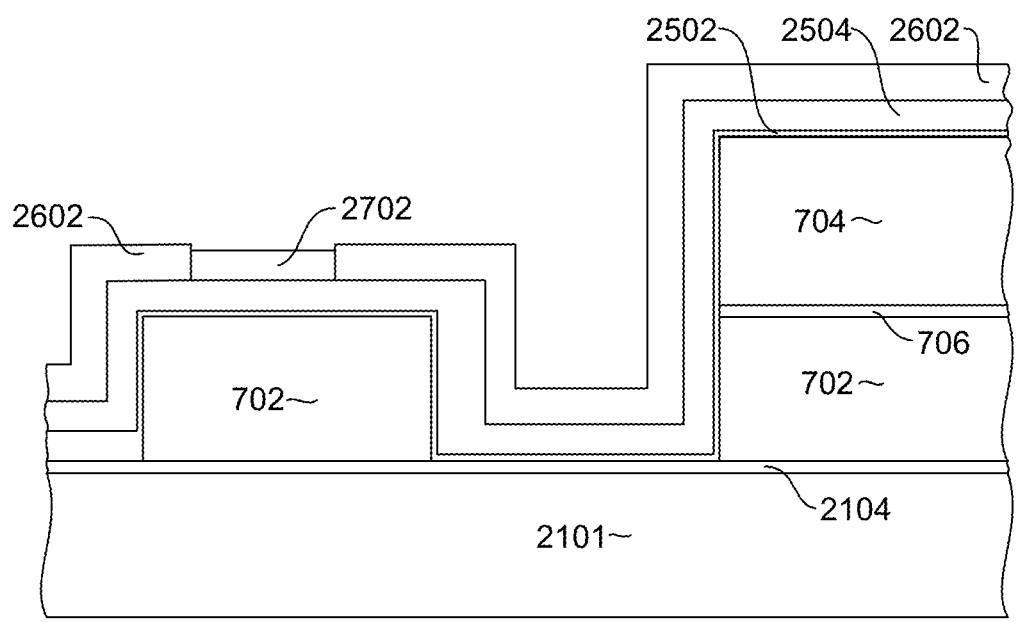

With reference to FIG. 26, a photoresist mask 2602 is formed. The photoresist mask can be formed by depositing a layer of photoresist and photolithographically patterning the photoresist to leave an opening in a location where a contact pad will be formed. Then, as shown in FIG. 27, an electrically conductive material such as Cu or Au 2702 is electroplated into the opening in the mask 2602. This electroplated electrically conductive material 2702 will form the contact pad 606 for making contact with the laser diode contact pad 512 at the backside surface of the slider 502 as shown in FIG. 7.

Figure 28:
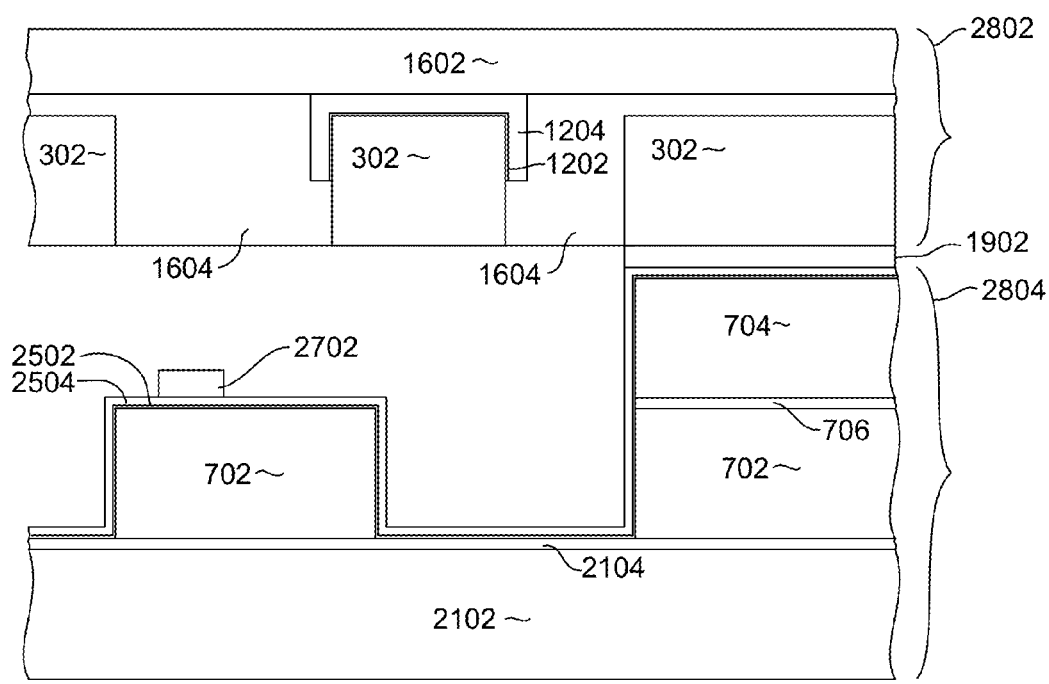
Figure 29:
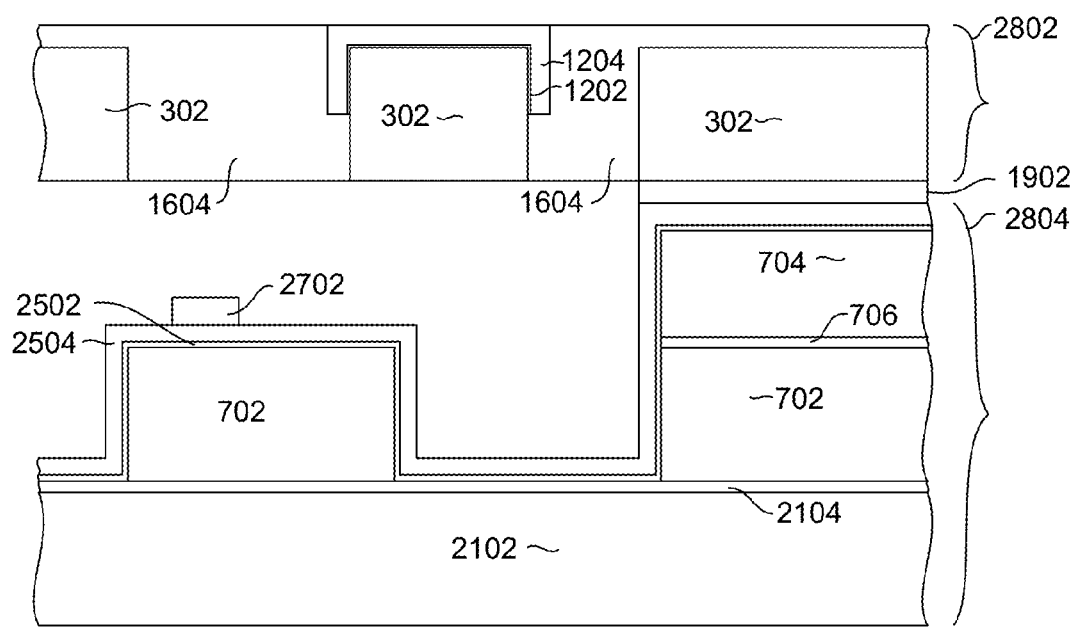

After the electrically conductive material 2702 has been electroplated, the photoresist 2602 is removed. Then, as shown in FIG. 28, the first fixture layer 2802 (previous formed with reference to FIGS. 8-20) is bonded to the second test fixture portion 2804 (formed with reference to FIGS. 21-27). The first and second test fixture layers 2802, 2804 can be bonded together by an adhesive such as the adhesive tape 1902 described above with reference to FIG. 19.

Figure 30:
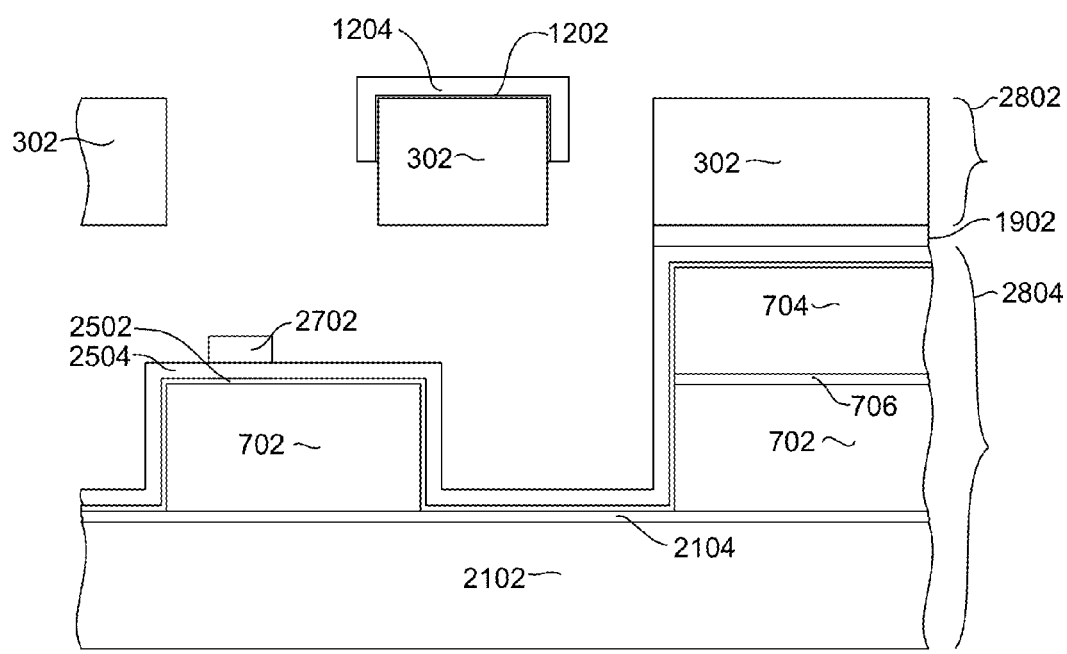

It should be pointed out here that support structures 1602 and bonding material 1604 are present to support the first layer 2802 and support layers 802, 804 are present to support the layer 2804 during bonding. After the layers 2802, 2804 are bonded together, a backside lapping process can be performed to remove layers 802, 804 from the bottom of the second test claim layer 2804. The layers 1604, 1602 provide support during this lapping, leaving a structure as shown in FIG. 30. Then, a bond removal is performed to remove layers 1604 and 1602, leaving a structure as shown in FIG. 30.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A test fixture for testing a slider, the slider having a trailing edge surface having an electrically conductive contact pad formed thereon and a backside surface having an electrically conductive contact pad formed thereon, the test fixture comprising:
   a first portion having at least one electrically conductive contact pad configured to make contact with the contact pad formed on the trailing edge surface of the slider; and
   a second portion connected with the first portion, the second portion having an electrically conductive contact pad configured to make contact with the contact pad formed on the backside surface of the slider;
   wherein the first portion comprises a silicon structure having an electrically conductive lead formed thereon.

2. The test fixture as in claim 1 further comprising:
   a first electrically conductive lead connected with the contact pad formed on the first portion and configured to make electrical contact with a first electrical contact of a suspension assembly; and
   a second electrically conductive lead connected with the contact pad formed on the second portion and configured to make electrical contact with a second electrical contact of the suspension assembly.

3. The test fixture as in claim 1, wherein the first portion is a silicon on insulator structure that includes first and second layers of silicon and an electrically insulating layer formed between the first and second layers of silicon.

4. The test fixture as in claim 1, wherein the electrically conductive lead comprises gold.

5. The test fixture as in claim 1, wherein the contact pad of the second portion can be used to measure performance of laser diode formed on the slider.

6. The test fixture as in claim 1, wherein the test fixture is configured to measure performance of a laser diode formed on the slider while also measuring performance of read and write heads also formed on the slider.

7. The test fixture as in claim 1, wherein the first portion has an end that is configured to engage a suspension assembly, the test fixture further comprising:
   an electrically conductive lead that connects the electrically conductive contact pad of the first portion with a first electrically conductive contact at the end of the first portion; and
   an electrically conductive lead that connects the electrically conductive contact pad of the second portion with a second electrically conductive contact at the end of the first portion.

8. The test fixture as in claim 1, wherein the first and second portions are bonded to one another by an adhesive.

9. A test fixture for testing a slider, the slider having a trailing edge surface having an electrically conductive contact pad formed thereon and a backside surface having an electrically conductive contact pad formed thereon, the test fixture comprising:
   a first portion having at least one electrically conductive contact pad configured to make contact with the contact pad formed on the trailing edge surface of the slider; and
   a second portion connected with the first portion, the second portion having an electrically conductive contact pad configured to make contact with the contact pad formed on the backside surface of the slider;
   wherein the first portion includes silicon formed with a spring structure configured to bias the slider against the contact pad of the first portion.

10. A test fixture for testing a slider, the slider having a trailing edge surface having an electrically conductive contact pad formed thereon and a backside surface having an electrically conductive contact pad formed thereon, the test fixture comprising:
    a first portion having at least one electrically conductive contact pad configured to make contact with the contact pad formed on the trailing edge surface of the slider; and
    a second portion connected with the first portion, the second portion having an electrically conductive contact pad configured to make contact with the contact pad formed on the backside surface of the slider;
    wherein the second portion has a recessed portion on which the electrically conductive contact pad of the second portion is formed and has a raised portion that is connected with the first portion.

11. A test fixture for testing a slider, the slider having a trailing edge surface having an electrically conductive contact pad formed thereon and a backside surface having an electrically conductive contact pad formed thereon, the test fixture comprising:
    a first portion having at least one electrically conductive contact pad configured to make contact with the contact pad formed on the trailing edge surface of the slider; and
    a second portion connected with the first portion, the second portion having an electrically conductive contact pad configured to make contact with the contact pad formed on the backside surface of the slider;

wherein the electrically conductive contact pad of the first portion is oriented at substantially 90 degrees relative to the contact pad of the second portion.

12. A method of manufacturing a test fixture for testing a slider of a magnetic data recording system, the method comprising:

forming a first test fixture portion having an electrically conductive contact pad formed thereon that is configured to make contact with an electrically conductive contact pad formed on a trailing edge of a slider;

forming a second portion;

recessing a portion of the second portion to form a recessed portion and a non-recessed portion; and forming an electrically conductive contact pad on the recessed portion; and bonding the first portion to the second portion.

13. The method as in claim 12, wherein the electrically conductive contact pad formed on the second portion is configured to make electrical contact with a contact pad formed on a backside surface of the slider.

14. The method as in claim 12, wherein the bonding of the first and second portions is performed by bonding non-recessed portion of the second portion with the first portion, leaving the recessed portion of the second portion unbonded.

15. The method as in claim 12, wherein the recessing is performed by etching.

16. The method as in claim 12, further comprising forming electrically conductive leads that are electrically connected with the electrically conductive contact pad of the first portion.

17. The method as in claim 12, further comprising forming electrically conductive leads that are electrically connected with the electrically conductive contact pad of the second portion.

18. The method as in claim 12, wherein the first and second portions each comprise silicon.

* * * * *